US008196126B2

(12) United States Patent  
Ziegler

(10) Patent No.: US 8,196,126 B2  
(45) Date of Patent: Jun. 5, 2012

(54) METHODS AND SYSTEMS FOR DYNAMICALLY GENERATING AND OPTIMIZING CODE FOR BUSINESS RULES

(75) Inventor: Carsten Ziegler, Walldorf (DE)

(73) Assignee: SAP AG, Walldorf (DE)

( * ) Notice: Subject to any disclaimer, the term of this patent is extended or adjusted under 35 U.S.C. 154(b) by 1254 days.

(21) Appl. No.: 11/976,814

(22) Filed: Oct. 29, 2007

(65) Prior Publication Data

US 2009/0113387 A1 Apr. 30, 2009

(51) Int. Cl.
  *G06F 9/44* (2006.01)
  *G06F 9/45* (2006.01)
  *G06Q 10/00* (2006.01)
  *G06Q 30/00* (2006.01)

(52) U.S. Cl. ........ 717/153; 717/111; 717/116; 717/121; 717/152; 705/7.27; 705/14.43

(58) Field of Classification Search .................. None  
See application file for complete search history.

(56) References Cited

U.S. PATENT DOCUMENTS

| | | | | |
|---|---|---|---|---|
| 6,016,477 A | * | 1/2000 | Ehnebuske et al. | 705/7.11 |
| 6,269,474 B1 | * | 7/2001 | Price | 717/104 |
| 6,745,381 B1 | * | 6/2004 | Ehnebuske et al. | 717/100 |
| 6,990,466 B1 | * | 1/2006 | Hu | 705/35 |
| 7,483,955 B2 | * | 1/2009 | Gupta et al. | 709/209 |
| 7,669,133 B2 | * | 2/2010 | Chikirivao et al. | 715/744 |
| 7,689,442 B2 | * | 3/2010 | Childress et al. | 705/4 |
| 7,827,206 B2 | * | 11/2010 | Holmes et al. | 707/802 |
| 2003/0093780 A1 | * | 5/2003 | Freudenberger et al. | 717/153 |
| 2003/0172367 A1 | * | 9/2003 | Kannenberg | 717/101 |
| 2005/0096959 A1 | * | 5/2005 | Kumar et al. | 705/8 |
| 2006/0225032 A1 | * | 10/2006 | Klerk et al. | 717/105 |
| 2007/0179821 A1 | * | 8/2007 | Poetsch et al. | 705/7 |
| 2008/0320486 A1 | * | 12/2008 | Bose et al. | 718/105 |
| 2009/0113384 A1 | * | 4/2009 | Kosov et al. | 717/105 |
| 2009/0319313 A1 | * | 12/2009 | Subash et al. | 705/7 |

OTHER PUBLICATIONS

Roberto et al. "Metadata Modularization Using Domain Annotations", 2004, pp. 1-6.*

* cited by examiner

*Primary Examiner* — Isaac Tecklu  
(74) *Attorney, Agent, or Firm* — Finnegan, Henderson, Farabow, Garrett & Dunner LLP

(57) ABSTRACT

Systems and methods are provided for generating high-level program code of a rule-based application for interpreting and executing business rules. In one exemplary embodiment, a method is provided that comprises retrieving high-level program code capable of performing the functionality of a business rule called by the rule-based application, wherein the high-level program code includes an annotated set of instructions for the dynamic generation of generated code. The method may also comprise processing the annotated set of instructions with a generator component to create generated code from the high-level program code, mapping the generated code to the called business rule, and utilizing the generated code to execute the functionality of the called business rule.

14 Claims, 5 Drawing Sheets

METHODS AND SYSTEMS FOR DYNAMICALLY GENERATING AND OPTIMIZING CODE FOR BUSINESS RULES

DETAILED DESCRIPTION

1. Technical Field

The present invention generally relates to the field of software design and programming. More specifically, the invention relates to methods and systems for dynamically generating and optimizing code for business rules.

2. Background Information

The operation of businesses and enterprises are governed by business rules. These business rules may be created based on government or trade regulations, industry standards, or the policies of the individual business. Therefore, business rules may be generally defined as logical statements or instructions of what to do in different distinct situations. For example, a simple business rule may set forth that for each Internet sale, a copy of the transaction must be mailed to the customer. A more complicated business rule may involve the processing of a loan. As a result, the overall operation of an enterprise may be based upon hundreds, if not thousands of business rules.

Business rules are constantly being created and modified by authorized personnel within an enterprise, such as a business analysts or a central policy committee. Generally, business rules are stored in a database and are accessed by other applications to carry out the functionalities described by application code. Although business rules may be expressed in the form of high-level programming code, business rules may also be expressed in a more user-friendly format, such as decision tables and decision trees. This allows, for example, a business analyst to change a business rule using a user interface tool without needing extensive knowledge of high-level programming codes.

Business rules may be utilized and acted upon by software applications developed and maintained by software developers. Such software applications are often referred to as "rule-based applications." A software component, such as a "business rules engine," may provide the nexus between the rule-based applications and related business rules. In particular, a business rule engine allows business rules to be stored separately from the application code of a rule-based application. For example, business rules may be stored in a business rule repository. And, because business rules may change rather frequently, the separation of the application code from the business rule facilitates an authorized business user's ability to change the business rule without the assistance of a programmer or the information technology (IT) department within that user's enterprise.

In operation, a business rule engine may access data stored in a data repository and apply that data against a business rule stored in a separate business rule repository. The business rule engine determines which business rules are relevant to a select piece of data or data set. As can be imagined, a key requirement of any business rule engine is high performance. That is, the business rule engine must be able to demonstrate a performance comparable to what a software developer would do without using the business rule engine. Therefore, the business rule engine should be capable of automatically selecting data from the repository and automatically selecting the appropriate business rule from the business rule repository to combine and interpret the data.

Because business rules may be created in a graphical user interface representation form (e.g., decision tables and data trees), in order for a rule-based application to utilize the functionality of business rules, a process herein referred to as "interpretation" may be necessary. In the interpretation process, an interpreter component may interpret and convert business rules into a high-level computer language, such as Advanced Business Application Programming (ABAP) (developed by SAP AG), C++, or the like. The interpreter component may accomplish this by mapping business rules to program code previously developed by a developer using a high-level computer language, and outputting program code to be processed by the rule-based application. However, a problem with this interpretation process is that the resulting program code is not in its most efficient form for each computer system or environment within which the rule-based application will run. For example, the interpreter component may map a business rule to program code of the high-level computer language that is capable of executing functions in excess of what is required for the specific business rule. Because the selected program code can contain more logic than is necessary for the execution of the specific business rule, the computer system or environment will be forced to process unnecessary program code. The unnecessary program code may result in a drain of system resources and overall performance.

Accordingly, there is a need for systems and methods that are capable of dynamically generating and optimizing program code for business rules.

SUMMARY

In accordance with the principles of the present invention, as embodied and broadly described herein, methods and systems are provided for dynamically generating and optimizing code for applied business rules.

According to one embodiment, a method is provided for generating high-level program code of a rule-based application for interpreting and executing business rules. The method comprises retrieving high-level program code capable of performing the functionality of a business rule called by the rule-based application, wherein the high-level program code includes an annotated set of instructions for the dynamic generation of generated code. The method may also comprise processing the annotated set of instructions with a generator component to create generated code from the high-level program code, mapping the generated code to the called business rule, and utilizing the generated code to execute the functionality of the called business rule.

In another aspect of the invention, a computer-readable medium including program instructions is provided for performing, when executed by a processor, a method for generating high-level program code of a rule-based application for interpreting and executing business rules. The method comprises retrieving high-level program code capable of performing the functionality of a business rule called by the rule-based application, wherein the high-level program code includes an annotated set of instructions for the dynamic generation of generated code. The method may also comprise processing the annotated set of instructions with a generator component to create generated code from the high-level program code, mapping the generated code to the called business rule, and utilizing the generated code to execute the functionality of the called business rule.

In another aspect of the invention, a business rule engine is provided for generating high-level program code of a rule-based application for interpreting and executing business rules. The business rule engine comprises an interpreter component for performing an interpretation process, wherein a graphical user interface representation of business rule may be mapped to retrieved high-level program code needed to execute the functionality of a business rule; and a generator component for dynamically generating code in accordance with an annotated set of instructions for the dynamic generation of generated code.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of several further features disclosed below in the detailed description.

BRIEF DESCRIPTION OF THE DRAWINGS

The accompanying drawings, which are incorporated in and constitute a part of this specification, show features of implementations consistent with the present invention and, together with the description, help explain principles associated with the invention. In the drawings.

DESCRIPTION OF THE EMBODIMENTS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
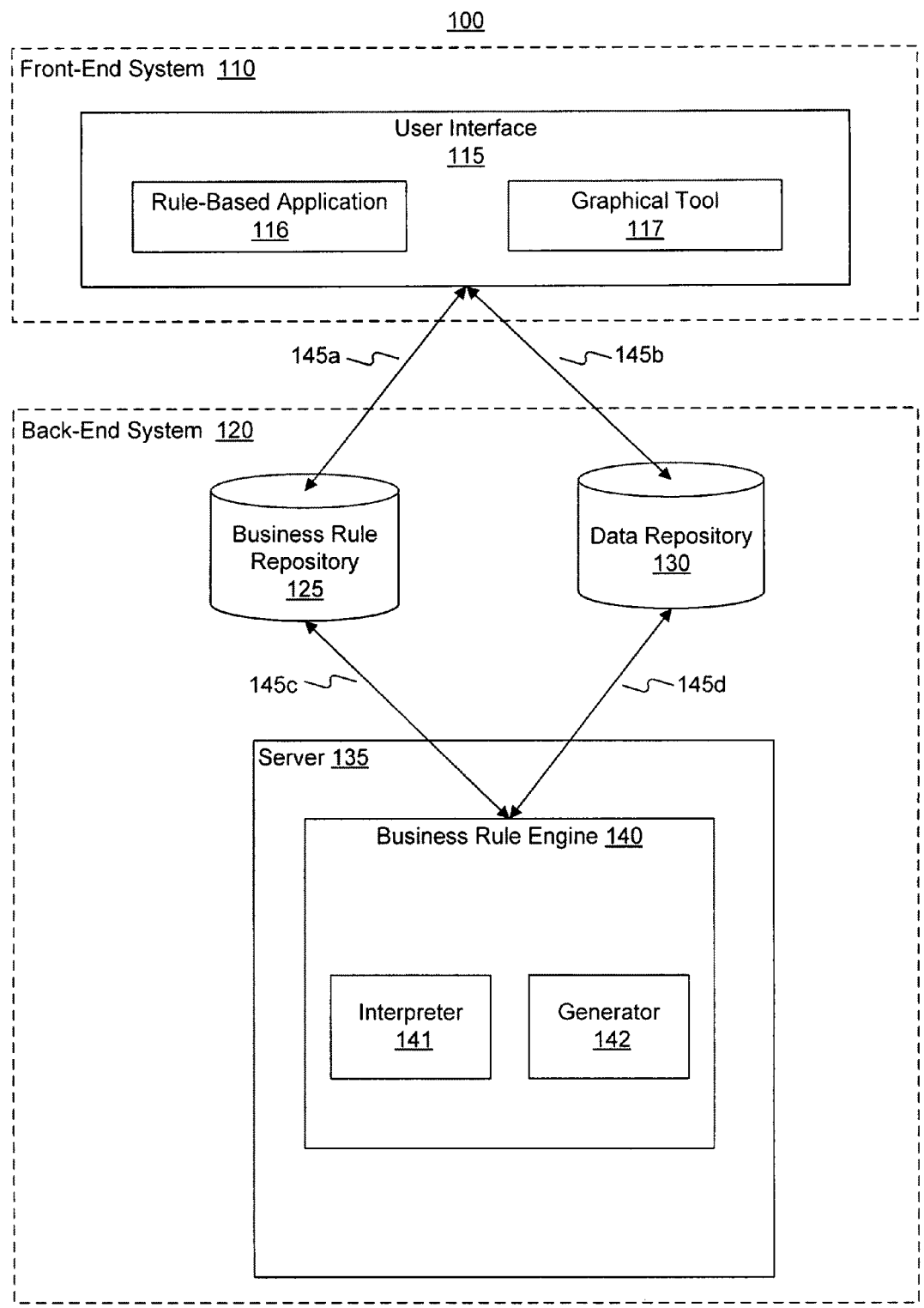
FIG. 1 illustrates a block diagram of an exemplary system, consistent with an embodiment of the present invention.

FIG. 1 illustrates a block diagram of an exemplary system 100. As shown in FIG. 1, system 100 includes a front-end system 110, which may comprise a user interface 115. User interface 115 may comprise a rule-based application 116 and a graphical tool 117. Rule-based application 116 may be a software application, written in a high-level computer program language, that utilizes the functionality or acts upon a business rule. Graphical tool 117, as described in further detail below, may be a software application capable of creating or modifying a business rule.

System 100 may also include a back-end system 120 comprising a business rule repository 125, a data repository 130, and a server 135. The server 135 may in turn comprise a business rule engine 140, which comprises an interpreter 141 and a generator 142. It should be noted that although FIG. 1 shows a single front-end system and a single back-end system 120, a plurality of front-end systems and/or back-end systems may be used. Moreover, the components depicted in FIG. 1 may be distributed among multiple locations or systems.

Figure 2:
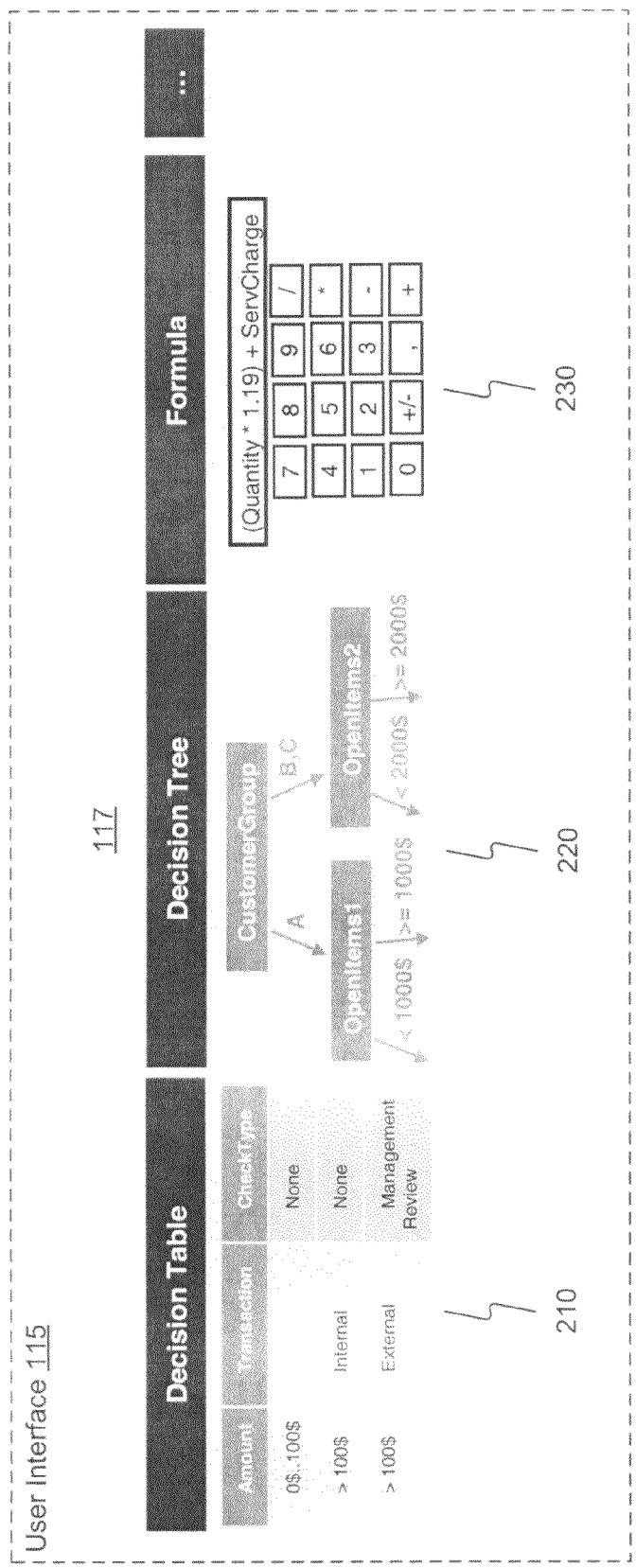
FIG. 2 illustrates an exemplary graphical tool for the creation of business rules, consistent with an embodiment of the present invention.

Front-end system 110 may include one or more processors, such as computers, to interface with back-end system 120. User interface 115 may provide an interface to allow an authorized user access to a rule-based application 116 or a graphical tool 117. For example, access to a graphical tool 117 as illustrated in FIG. 2, may allow modeling of business rules through the use of an intuitive interface for a business user. Graphical tool 117 may be specifically designed for a business user and, therefore, may use business dialect as opposed to syntax of a high-level computer language. User interface 115 may allow graphical tool 117 to access business rule repository 125 and data repository 130 via network connections 145a and 145b. Other network connections 145c and 145d may also be provided, as shown in FIG. 1.

Network connections 145a-145d may include, alone or in any suitable combination, a telephony-based network, a local area network (LAN), a wide area network (WAN), a dedicated intranet, wireless LAN, the Internet, and intranet, a wireless network, a bus, or any other communication mechanisms. Further, any suitable combination of wired and/or wireless components and systems may provide network connections 145a-145d. Moreover, network connections 145a-145d may be embodied using bi-directional, unidirectional, or dedicated communication links. Network connections 145a-145d may also implement standard transmission protocols, such as Transmission Control Protocol/Internet Protocol (TCP/IP), Hyper Text Transfer Protocol (HTTP), SOAP, Remote Procedure Call (RPC), or other protocols.

As illustrated in the exemplary embodiment of FIG. 2, the graphical tool 117 may comprise different modeling functions or methods for a user to create and modify business rules. For example, a user may create a business rule using a decision table 210, a decision tree 220, or a formula 230. Each business rule may be created utilizing data stored in data repository 130, and the business rule itself may be stored in business rule repository 125.

Decision table 210 may comprise a list of decisions and the conditions on which they are based. For example, in the illustrated decision table 210, the decision performed is indicated by the column "Check Type" and the condition on which this decision is performed is indicated by the data in columns "Amount" and "Transaction." Before a decision is returned, each row and each cell within a row is processed. When all cells in a row have a positive result, a decision is returned. When there is no condition in a cell, the cell is ignored. Therefore, in this illustrated example, wherein the amount criteria is between zero and one hundred dollars, the check type performed is "None," irrespective of whether the transaction is internal or external. However, if the amount criteria is greater than one hundred dollars and the transaction is external, the check type performed is "Management Review." Although not illustrated, decision table 210 may incorporate additional techniques, such as "if-then-else" statements or priority sequencing of actions in order to model more complicated business rules.

Another modeling method that may be used by graphical tool 117 is a decision tree 220. Decision tree 220 comprises a graph of decisions and possible resulting consequences. For example, in the illustrated decision tree 220, the first decision is "CustomerGroup." This decision sorts customers into groups A, B, and C. As illustrated, if a customer belongs to group A, they are routed to a decision block "OpenItems1" and if they belong to group B or C, they are routed to decision block "OpenItems2." Subsequently, customers in group A may be routed based on the existing dollar or other amount of their open invoice items. Customers in groups B and C may also be routed on the existing dollar amount of their open invoice items. However, as illustrated, a greater dollar amount may be used for customers in groups B and C than the dollar amount used for customers in group A.

Yet another modeling method that may be used by graphical tool 117 is a formula 230. Formula 230 is capable of modeling a business rule based upon a mathematical expression and different data variables. The illustrated formula may be used, for example, to create a business rule for calculating the sale price of goods in a specific locality by factoring in a locality tax of nineteen percent and a locality service charge ("ServCharge"). The modeled business rules of decision table 210, decision tree 220, and formula 230 may be stored in the business rule repository 125 as illustrated in FIG. 1.

Figure 3:
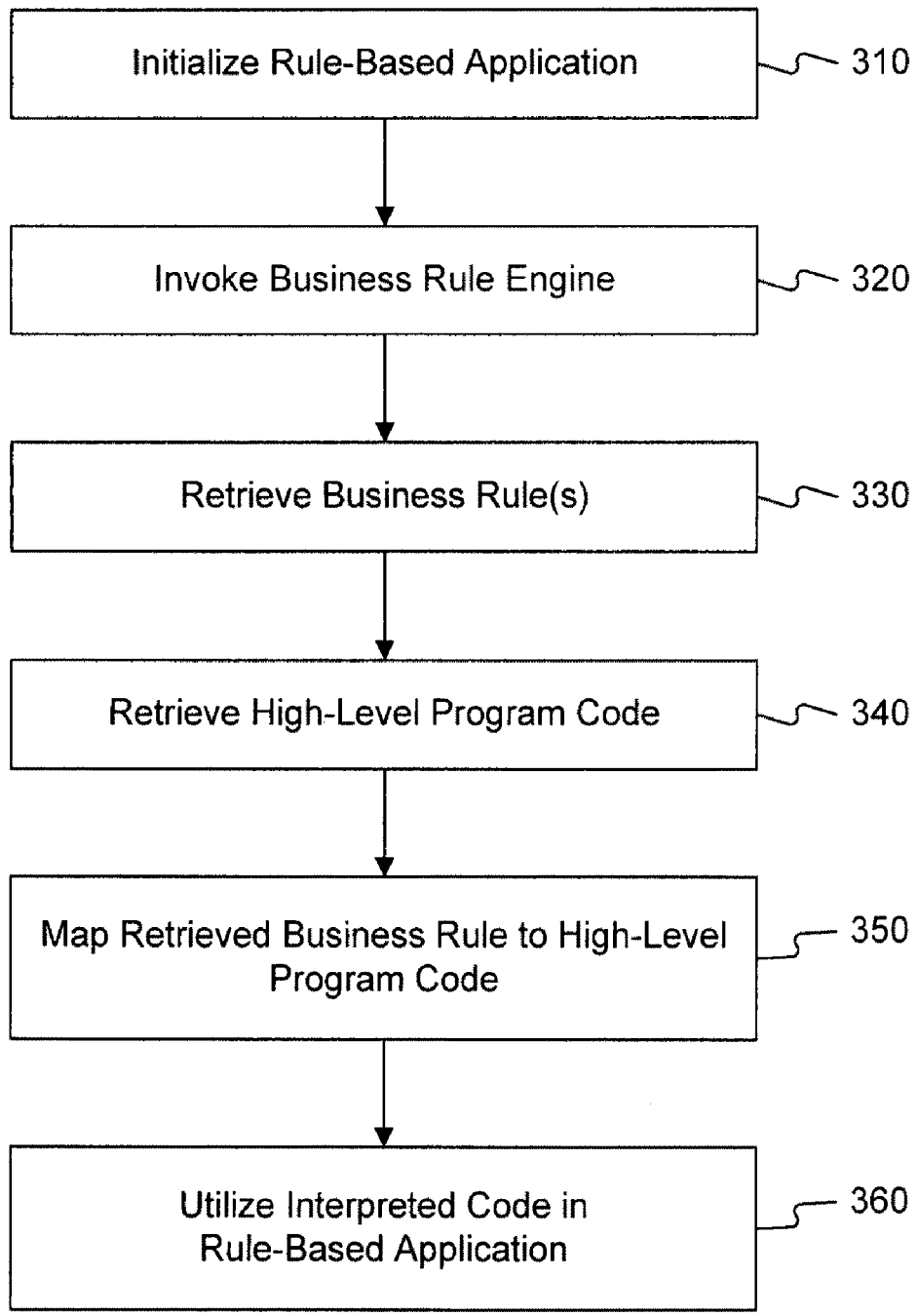
FIG. 3 illustrates a flowchart of a method for an interpretation process.

FIG. 3 illustrates a flowchart of an interpretation process. In an initial step, a rule-based application is initialized (step 310). The rule-based application may be written in the ABAP programming language and may include function calls to business rules stored in business rule repository 125. Business rule engine 140, which is capable of executing the business rules stored within business rule repository 125 using data stored in data repository 130, may be invoked through a function call or routine of the rule-based application (step 320).

The function call may be processed by the business rule engine 140, and based upon parameters set forth in the function call, the business rule engine 140 may retrieve the appropriate business rule from the business rule repository 125 (step 330). Subsequently, the business rule engine 140 may retrieve high-level program code necessary to executed the functionality of the business rule from the business rule repository 125 (step 340.) An example of high-level program code necessary to execute the functionality of the business rule may be written as follows:

```
METHOD if_fdt_data_object~create_data_reference.
DATA: lv_element_type TYPE if_fdt_types=>element_type,
      lv_msgv1        TYPE symsgv,
      ls_message      TYPE if_fdt_types=>s_message,
      lt_message      TYPE if_fdt_types=>t_message.
IF iv_timestamp IS SUPPLIED.
    lv_element_type = if_fdt_element~get_element_type( iv_timestamp ).
ELSE.
    lv_element_type = if_fdt_element~get_element_type( ).
ENDIF.
CASE lv_element_type.
WHEN if_fdt_constants=>gc_element_type_boolean.
CREATE DATA er_data TYPE if_fdt_types=>element_boolean.
WHEN if_fdt_constants=>gc_element_type_number.
CREATE DATA er_data TYPE if_fdt_types=>element_number.
WHEN if_fdt_constants=>gc_element_type_amount.
CREATE DATA er_data TYPE if_fdt_types=>element_amount.
WHEN if_fdt_constants=>gc_element_type_quantity.
CREATE DATA er_data TYPE if_fdt_types=>element_quantity.
WHEN if_fdt_constants=>gc_element_type_text.
CREATE DATA er_data TYPE if_fdt_types=>element_text.
WHEN OTHERS.
    lv_msgv1 = cx_fdt=>get_object_name( if_fdt_admin_data~mv_id ).
MESSAGE x041(fdt_core) WITH lv_msgv1 INTO ls_message-text.
MOVE-CORRESPONDING syst TO ls_message.
    ls_message-source      = cx_fdt=>get_source_name( ).
    ls_message-id          = if_fdt_admin_data~mv_id.
    ls_message-object_type = if_fdt_constants=>gc_object_type_filter.
    APPEND ls_message TO lt_message.
    RAISE EXCEPTION TYPE cx_fdt_config EXPORTING mt_message = lt_message.
ENDCASE.
eo_datadescr ?= cl_abap_typedescr=>describe_by_data_ref( er_data ).
ENDMETHOD.
```

The interpreter component 141 may then perform an interpretation process, wherein the retrieved graphical user interface representation of the business rule may be mapped to the retrieved high-level program code necessary to executed the functionality of the business rule (step 350). The interpreted program code may then perform the functionality of the business rule as called by the rule-based application 116. In turn, the interpreted program code may be utilized by the rule-based application 116 (step 360).

The basic functionality of the above high-level program code is to create a list of variable attribute definitions, create a dynamic variable according to the defined variable attributes, and create an object that describes the dynamic variable. However, for the object to be created, access to the data repository 110 is required.

Figures 5A, 5B, 5C:
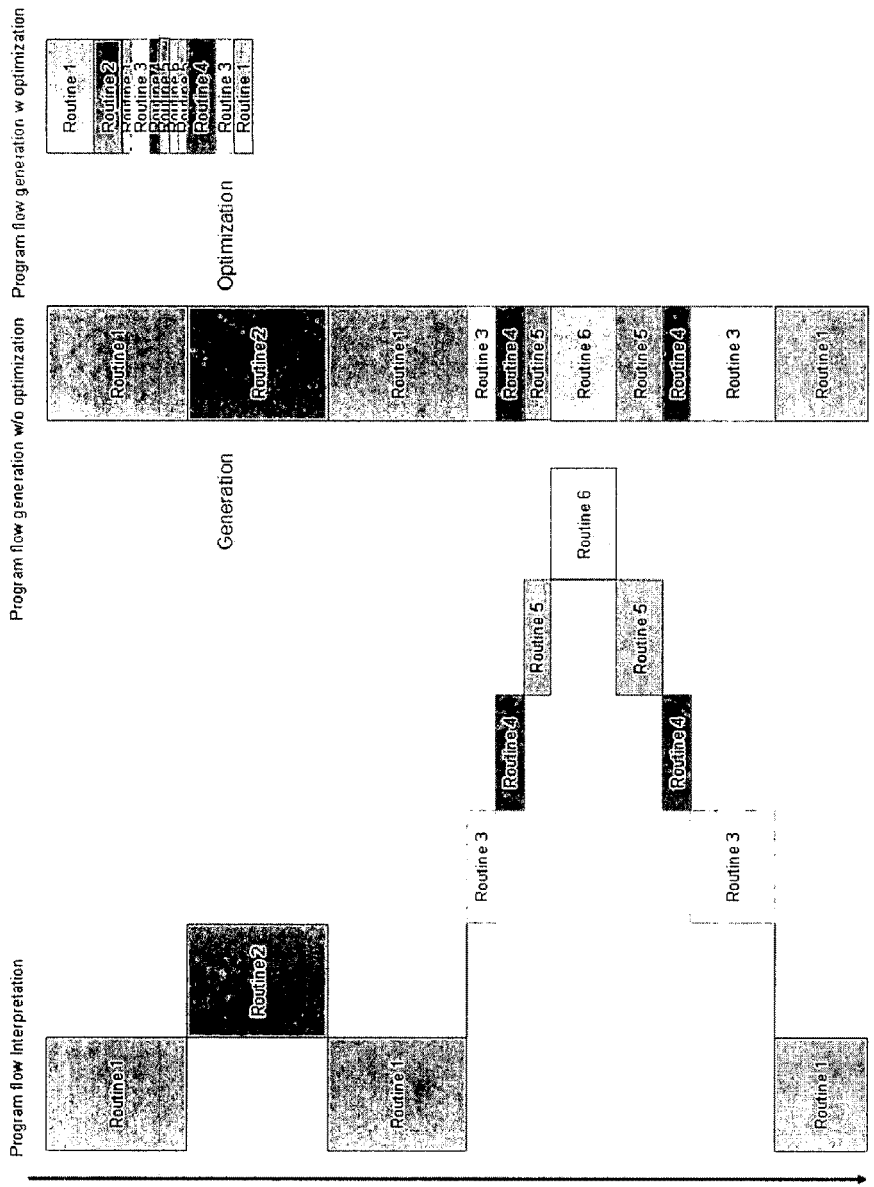
FIGS. 5A, 5B, and 5C illustrate exemplary program flow diagrams, consistent with embodiments of the present invention.

An example of the program flow of the business rule that may be obtained using the above interpretation process is illustrated in FIG. 5A. As illustrated in FIG. 5A, because there may be many objects/classes (i.e., routines) in the interpretation program flow, a lot of data has to be read from the data repository 130, and there are many transitions and data copying between the routines. Specifically, in the above example, the object that describes the dynamic variable requires access to data repository 110. This, along with other transactions and data copies, may not be necessary to the execution of the business rule. Therefore, an unnecessary drain on system resources may result from the execution of the business rule using the interpretation process.

Figure 4:
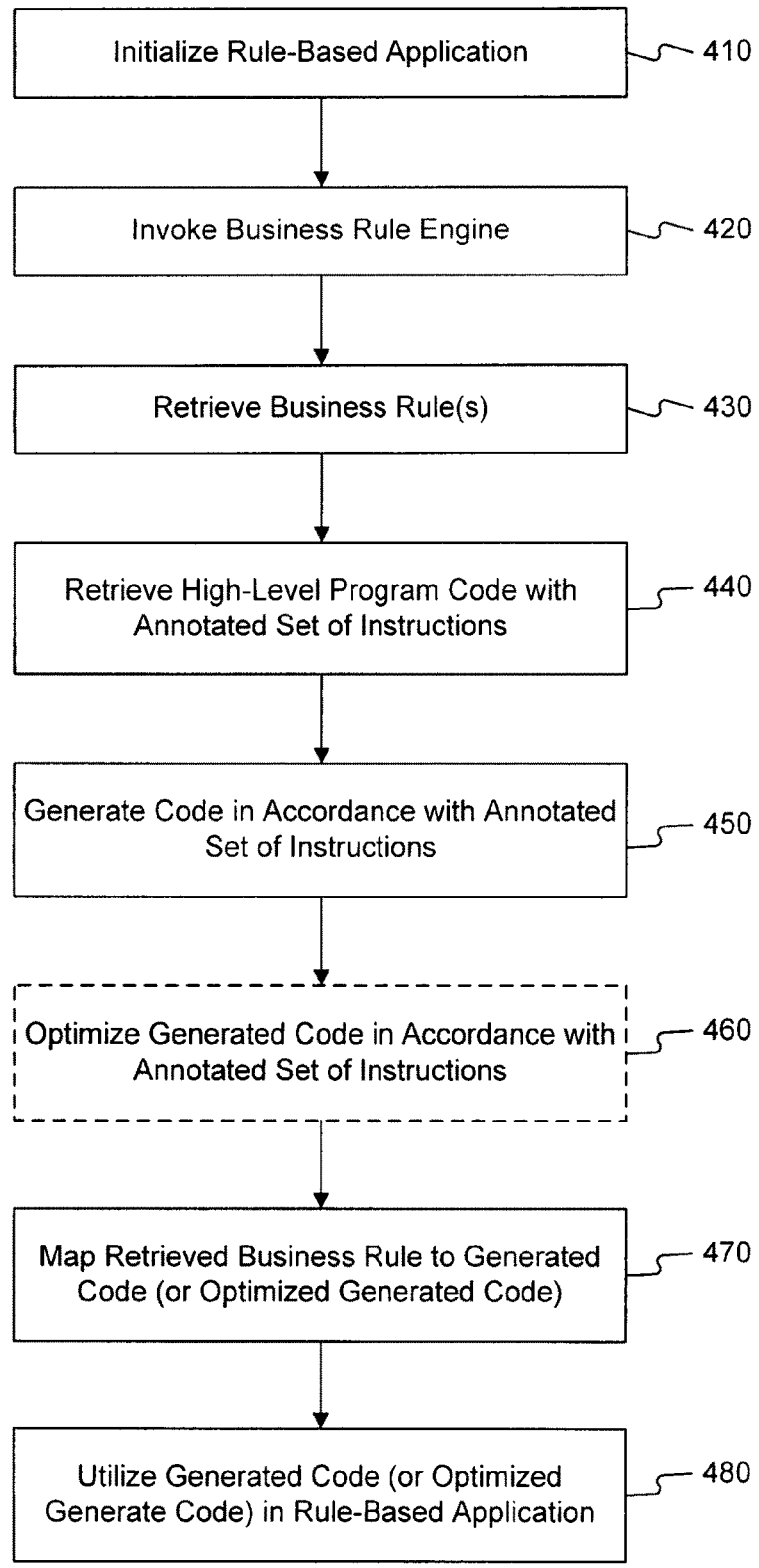
FIG. 4 illustrates a flowchart of an exemplary method for a generation and optimization process, consistent with an embodiment of the present invention

Consistent with an embodiment of the invention, FIG. 4 illustrates a flowchart of an exemplary method for generating and optimizing high-level program code for a business rule utilized by a rule-based application. In FIG. 4, steps 410-430 are similar to the previously detailed steps 310-330 of FIG. 3 associated with the interpretation process. However, in step 440 of FIG. 4, the generator component 142 retrieves high-level program code necessary to execute the functionality of the business rule, wherein the high-level program code includes an annotated set of instructions.

The annotated set of instructions may include instructions used by the generator 142 for the dynamic generation of generated code. The annotated set of instructions may also include instructions used by the generator 142 to produce optimized generated code. The annotated set of instructions may be placed in the high-level program code necessary to execute the functionality of a business rule, however, it is not processed by a compiler of that high-level program code. For example, in the ABAP programming language the symbols "$" and "@" are not utilized in its programming syntax. Therefore, these symbols may be used by a developer to insert annotated set of instructions that would instruct the generator 142 on how to perform the generation and optimization of the code for a particular business rule.

In one embodiment, the annotated set of instructions may utilize the syntax of the ABAP programming language. However, as indicated above, by delineating the annotated set of instructions with the symbols "$" and "@," the annotated set of instructions will not be processed by the ABAP compiler. However, the symbols "$" and "@" may serve as a flag to the generator 142 that annotated set of instructions are provided. The generator 142 will in turn process the annotated set of instructions.

A developer may place the annotated set of instructions into the code during the original development of the code or the annotated set of instructions may be added subsequent to development, but prior to the business rule being retrieved by the business rule engine 140.

An example of code with added annotated set of instructions is reproduced below.

```
*@nocomposer
METHOD if_fdt_data_object~create_data_reference.
*@ The method is also a template for the code composer.
DATA: lv_element_type TYPE if_fdt_types=>element_type,
      lv_msgv1        TYPE symsgv,
      ls_message      TYPE if_fdt_types=>s_message,
      lt_message      TYPE if_fdt_types=>t_message.
IF iv_timestamp IS SUPPLIED.
      lv_element_type =
      if_fdt_element~get_element_type( iv_timestamp ).
ELSE.
      lv_element_type = if_fdt_element~get_element_type( ).
ENDIF.
CASE lv_element_type.
WHEN if_fdt_constants=>gc_element_type_boolean.
CREATE DATA er_data TYPE if_fdt_types=>element_boolean.
WHEN if_fdt_constants=>gc_element_type_number.
CREATE DATA er_data TYPE if_fdt_types=>element_number.
WHEN if_fdt_constants=>gc_element_type_amount.
CREATE DATA er_data TYPE if_fdt_types=>element_amount.
WHEN if_fdt_constants=>gc_element_type_quantity.
CREATE DATA er_data TYPE if_fdt_types=>element_quantity.
WHEN if_fdt_constants=>gc_element_type_text.
CREATE DATA er_data TYPE if_fdt_types=>element_text.
WHEN OTHERS.
      lv_msgv1 =
      cx_fdt=>get_object_name( if_fdt_admin_data~mv_id ).
MESSAGE x041(fdt_core) WITH lv_msgv1 INTO ls_message-text.
MOVE-CORRESPONDING syst TO ls_message.
      ls_message-source       = cx_fdt=>
                                get_source_name( ).
      ls_message-id           = if_fdt_admin_data~mv_id.
      ls_message-object_type  = if_fdt_constants=>
                                gc_object_type_filter.
      APPEND ls_message TO lt_message.
```

-continued

```
RAISE EXCEPTION TYPE cx_fdt_config EXPORTING
mt_message = lt_message.
ENDCASE.
*@end @nocomposer
*@case $lv_element_type$
*   @when $if_fdt_constants=>gc_element_type_boolean$
*     DATA $er_data$ TYPE if_fdt_types=>element_boolean.
*   @when $if_fdt_constants=>gc_element_type_number$
*     DATA $er_data$ TYPE if_fdt_types=>element_number.
*   @when $if_fdt_constants=>gc_element_type_amount$
*     DATA $er_data$ TYPE if_fdt_types=>element_amount.
*   @when $if_fdt_constants=>gc_element_type_quantity$
*     DATA $er_data$ TYPE if_fdt_types=>element_quantity.
*   @when $if_fdt_constants=>gc_element_type_text$
*     DATA $er_data$ TYPE if_fdt_types=>element_text.
*@end
*@nocomposer
eo_datadescr ?= cl_abap_typedescr=>describe_by_data_ref( er_data ).
*@end @nocomposer
*@if eo_datadescr @optional
*  $eo_datadescr$ ?=
cl_abap_typedescr=>describe_by_data( $er_data$ ).
*@end
*@nocomposer
ENDMETHOD.
*@end @nocomposer
```

Subsequent to the retrieving of high-level program code with annotated set of instructions, a generation process is performed (step 450). As used herein, "generation" refers to the process of putting together all the pieces of code and data needed to execute a business rule. For example, objects of the high-level program may depend on other objects and an exchange of code between the objects may be needed in order for each object to process data. In addition, the objects may require access to data repository 130 in order to retrieve data. The generation process creates generated code by retrieving the code needed by a particular object from the different objects or retrieving data from the data repository 130 and assembles it along with the code of the particular object into one consistent piece of code. As a result, the generation process eliminates the need for objects within the high-level program to retrieve code from other objects or data from the data repository 130.

In the above example of code with added annotated set of instructions, the annotated set of instructions eliminates the requirement for access to the data repository 130 in order for the object that describes the dynamic variable to be created. Instead, the annotated set of instructions generates code (i.e., generated code) that defines the required data statically and not dynamically. For example, the added annotated set of instructions utilizes the keyword "DATA" instead of "CREATE DATA," to therefore generate static data.

The annotated set of instructions used in the generation process may be processed by a generator component 142. An example of the program flow subsequent to the generation process is illustrated in FIG. 5B. The annotated set of instructions may, for example, instruct the generator component 142 to generate code that uses a constant value instead of calculating or retrieving a variable in specified situations. By removing unnecessary data calculations and retrievals, the generated code may comprise one routine as illustrated in FIG. 5B.

Moreover, as illustrated in FIG. 5C, an optional step of optimization of the generated code may also be performed by the generator component 142. For example, the generator component 142 may process the generated code and based upon the added annotated set of instructions, optimize the structure and content of the generated code (step 460).

Because step 460 is an optional step, it is shown in FIG. 4 as a dotted step. Accordingly aspects of the invention may bypass step 460.

As used herein, the term "optimization" refers to modifying (e.g., leave out some parts, prevent variable copying, combine similar subroutine calls, buffer intermediate results, etc.) based upon the annotated set of instructions. For example, as illustrated in FIG. 5C, because every piece of data known at the time of generation is generated in the optimized generated code, the optimized generated code need not access the data repository 130 and, thus, it is reduced in comparison to the interpretation mode illustrated in FIG. 5A. Also, many parts of the generated code may be recognized as not relevant for the specific data being used by the business object, therefore, these parts need not be included in the optimized generated code. The optimized generated code may then be mapped to the business rule as called by the rule-based application 116 (step 470). In turn, the optimized generated code may be utilized by the rule-based application 116 to perform the functionality of the called business rule (step 480).

In the event that the generated code is not optimized (i.e., step 460 is bypassed), the generated code is instead mapped to the business rule as called by the rule-based application 116 (step 470). The generated code may then be utilized by the rule-based application 116 to perform the functionality of the called business rule (step 480).

Each piece (e.g., class or object) of high-level program code that is relevant for the execution of the business rule may include a method GET_GENERATION_SOURCE_CODE with the following parameters:

| | |
|---|---|
| IV_METHOD_NAME | Importing CSEQUENCE (Method name) |
| ITS-PARAMETER | Importing TS_PARAMETER (Table of Parameters) |
| ET_SOURCE_CODE | Exporting T_SOURCE_CODE (Table for source code) |
| EV_NOT_SUPPORTED | Exporting ABAP_BOOL (ABAP_TRUE: service not available for this method) |

In each piece of high-level program code there may be several methods that are somewhat relevant for the generation and each of these results should be resolved. Therefore, method GET_GENERATION_SOURCE_CODE may be called for a method name (IV_METHOD_NAME). Since the returned code shall be put into another method, there may be variable name clashes. Therefore, a naming service may be provided in the generation process. The naming service may take the desired variable name, check it for uniqueness in the generation run, and return the name with optional concatenations. In ITS_PARAMETER there is a list of assignments of formal parameter names (as they are in the method interface of method in IV_METHOD_NAME) to actual parameter names (how the variables are really named in the generated source code). There may be recursive calls of GET_GENERATION_SOURCE_CODE.

While illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosures. The limitations in the claims are to be interpreted broadly based on the language employed in the claims and not limited to examples described in the present specification or during the prosecution of the application. Further, the steps of the disclosed methods may be modified in any manner, including by reordering steps and/or inserting or deleting steps, without departing from the principles of the invention. For example, the steps of creating generated code and optimizing generated code may be combined and performed in the same step. It is intended, therefore, that the specification and examples be considered as exemplary only, with a true scope and spirit of the invention being indicated by the following claims and their full scope of equivalents.

What is claimed is:

1. A computer-implemented method for generating high-level program code of a rule-based application for interpreting and executing business rules, comprising:
retrieving high-level program code capable of performing the functionality of a business rule called by the rule-based application, wherein the high-level program code includes a set of instructions that are annotated so that the instructions avoid processing by a compiler;
processing the annotated set of instructions with a generator component to create generated code from the high-level program code;
mapping the generated code to the called business rule; and
utilizing the generated code to execute the functionality of the called business rule,
wherein at least one instance of data exchange among objects of the high-level program code is removed from the generated code, and
wherein at least one instance of data exchange between an object of the high-level program code and a data repository is removed from the generated code.

2. The method of claim 1, wherein the annotated set of instructions also includes instructions for optimizing the generated code and processing the annotated set of instructions with the generator component to optimize the structure and content of the generated code and create optimized generated code.

3. The method of claim 2, wherein optimizing the structure and content of the generated code includes combining similar routines within the generated code.

4. The method of claim 2, wherein optimizing the structure and content of the generated code includes buffering intermediate results.

5. The method of claim 1, wherein retrieving high-level program code with an annotated set of instructions is performed by a business rule engine.

6. A non-transitory computer-readable medium including program instructions that, when executed by a processor, perform a method for generating high-level program code of a rule-based application for interpreting and executing business rules, the method comprising:
retrieving high-level program code capable of performing the functionality of a business rule called by the rule-based application, wherein the high-level program code includes a set of instructions that are annotated so that the instructions avoid processing by a compiler;
processing the annotated set of instructions with a generator component to create generated code from the high-level program code;
mapping the generated code to the called business rule; and
utilizing the generated code to execute the functionality of the called business rule,
wherein at least one instance of data exchange among objects of the high-level program code is removed from the generated code, and wherein at least one instance of data exchange between an object of the high-level program code and a data repository is removed from the generated code.

7. The computer-readable medium of claim 6, wherein the annotated set of instructions also includes instructions for optimizing the generated code and processing the annotated set of instructions with the generator component to optimize the structure and content of the generated code and create optimized generated code.

8. The computer-readable medium of claim 7, wherein optimizing the structure and content of the generated code includes combining similar routines within the generated code.

9. The computer-readable medium of claim 7, wherein optimizing the structure and content of the generated code includes buffering intermediate results.

10. The computer-readable medium of claim 6, wherein retrieving high-level program code with an annotated set of instructions is performed by a business rule engine.

11. A computer comprising a processor, and further comprising a business rule engine for generating high-level program code of a rule-based application for interpreting and executing business rules, the business rule engine comprising:
 a processor;
 an interpreter component for performing an interpretation process, wherein a graphical user interface representation of a business rule may be mapped to retrieved high-level program code needed to execute the functionality of a business rule; and
 a generator component for dynamically generating code in accordance with a set of instructions in retrieved high-level program code,
 wherein the set of instructions are annotated so that the instructions avoid processing by a compiler,
 wherein at least one instance of data exchange among objects of the high-level program code is removed from the generated code, and
 wherein at least one instance of data exchange between an object of the high-level program code and a data repository is removed from the generated code.

12. The computer of claim 11, wherein the annotated set of instructions are delineated by symbols not processed by a compiler of the high-level program code.

13. The computer of claim 11, wherein the annotated set of instructions also includes instructions for optimizing the generated code and the generator component optimizes the generated code, based on the annotated set of instructions, by combining similar routines within the generated code.

14. The computer of claim 13, wherein the generator component optimizes the generated code, based on the annotated set of instructions, by buffering intermediate results.

* * * * *